(12) United States Patent
Chen

(10) Patent No.: US 9,211,937 B2
(45) Date of Patent: Dec. 15, 2015

(54) LEG SCOOTER DEVICE

(71) Applicant: Shane Chen, Camas, WA (US)

(72) Inventor: Shane Chen, Camas, WA (US)

(*) Notice: Subject to any disclaimer, the term of this patent is extended or adjusted under 35 U.S.C. 154(b) by 0 days.

(21) Appl. No.: 14/090,656

(22) Filed: Nov. 26, 2013

(65) Prior Publication Data

US 2015/0145225 A1    May 28, 2015

(51) Int. Cl.
*B62M 1/00* (2010.01)
*A63C 17/01* (2006.01)

(52) U.S. Cl.
CPC . *B62M 1/00* (2013.01); *A63C 17/01* (2013.01)

(58) Field of Classification Search
CPC .......... B62M 1/00; B62M 1/12; A63C 17/01; A63C 17/011; A63C 17/04; A63C 17/045; A63C 17/06
USPC ................ 280/87.041, 87.021, 87.01, 87.042
See application file for complete search history.

(56) References Cited

U.S. PATENT DOCUMENTS

| | | | | | |
|---|---|---|---|---|---|
| 1,668,623 | A * | 5/1928 | Avril | .................... | 280/87.021 |
| 4,166,630 | A * | 9/1979 | Sullivan et al. | .......... | 280/87.021 |
| 4,445,699 | A * | 5/1984 | Darasko | ............... | A63C 17/045 |
| | | | | | 280/11.223 |
| 6,053,189 | A * | 4/2000 | Longenecker et al. | .. | 280/87.041 |
| 6,193,276 | B1 * | 2/2001 | Sottile | ..................... | A63C 17/01 |
| | | | | | 280/816 |
| 6,398,237 | B1 * | 6/2002 | Attey | ..................... | A63C 17/01 |
| | | | | | 188/29 |
| 6,634,660 | B2 * | 10/2003 | Miller | ..................... | 280/87.021 |
| 6,669,215 | B2 * | 12/2003 | Laporte | ..................... | 280/87.042 |
| 6,676,138 | B1 * | 1/2004 | Rosso | ..................... | 280/87.041 |
| 6,685,201 | B1 * | 2/2004 | Smith, III | .......... | A63C 17/0026 |
| | | | | | 280/288.1 |
| 6,837,504 | B2 * | 1/2005 | Garner | ..................... | 280/87.041 |
| 6,848,696 | B2 * | 2/2005 | Miller | ..................... | 280/87.021 |
| 6,926,294 | B2 * | 8/2005 | Lewis | ............... | A63C 17/0046 |
| | | | | | 280/87.041 |
| 7,147,235 | B2 * | 12/2006 | West | ..................... | A63C 17/013 |
| | | | | | 280/11.19 |
| 7,287,767 | B1 * | 10/2007 | Gomes et al. | ............. | 280/87.021 |
| 7,303,032 | B2 * | 12/2007 | Kahlert et al. | ........... | 280/87.041 |
| 8,579,306 | B2 * | 11/2013 | Lewis | ..................... | 280/87.042 |
| 8,746,716 | B1 * | 6/2014 | Wurst | .................. | A63C 17/013 |
| | | | | | 280/87.042 |
| 2005/0121873 | A1 * | 6/2005 | Miller | ..................... | 280/87.021 |
| 2006/0033297 | A1 * | 2/2006 | Miller | ..................... | 280/87.021 |
| 2007/0246308 | A1 * | 10/2007 | Sauve et al. | .................. | 188/2 D |

* cited by examiner

*Primary Examiner* — James M Dolak

(57) ABSTRACT

A leg scooter device having a platform to receive the foot of a user that is positioned between forward and aft wheels. An ascending member extends above the platform and contacts the lower leg of a user during use. It is through the lower leg's contact with the ascending member and the placement of one or both of the user's feet on the platform that the user "senses" the devices and controls it. The ascending member may be movable and/or configured to be biased toward contact with the user. Various embodiments are disclosed.

19 Claims, 4 Drawing Sheets

LEG SCOOTER DEVICE

FIELD OF THE INVENTION

The present invention relates to a "leg scooter", i.e., a scooter that is not controlled by a vertically ascending handlebar but rather through connection to a rider's lower leg.

BACKGROUND OF THE INVENTION

Various scooters are known in the art. Conventional scooters typically have a substantially horizontal foot platform, a vertically ascending handlebar, and front and rear wheels. In one conventional embodiment, there is a single front wheel and a handlebar connected to the wheel. Turning of the scooter is achieved by turning the handlebar which then turns the front wheel.

In another conventional embodiment, there are two substantially parallel front wheels that are pivotally connected to the foot platform such that a tilting of the platform achieves a turning of the paired front wheels. These types of scooters may have a vertically ascending handlebar that terminates in a ball grip or the like. The ball grip provides a secure connection between the rider and scooter, permit the rider to initiate leaning (and turning) and forward and rearward movement of the scooter relative to the rider.

What is lacking in the prior art is a scooter device that is operable without the use of hands or a vertically ascending handlebar. Hands free operation provides the convenience of having one's hands free (to carry objects, signal others, use mobile communication or music devices, etc.) and creates a different riding experience, among other benefits (more akin to surfing).

It should be recognized that there are skateboard devices that permit hands-free board skating, yet skate boards are a different devices. They typically have four small wheels (a front pair and a rear pair) and a platform elevated above the wheel pivot shafts. The elevated platform may be less stable than a lower platform and is more dangerous to fall off of. Further, the small wheels are more readily stopped by small stones and cracks/irregularities in a surface, and thus, they are quite limited in where they can be used. The larger wheels of scooters makes them more universally usable, among other features.

SUMMARY OF THE INVENTION

Accordingly, it is an object of the present invention to provide a leg scooter device that affords a hands-free scooter experience.

It is another object of the present invention to provide such a hands-free experience with sufficiently secure connection from rider to the platform to assure appropriate device control and safety.

It is yet another object of the present invention to provide a lower leg contact structure instead of a vertically ascending control handle to facilitate such control.

These and related objects of the present invention are achieved by use of a leg scooter device as described herein.

The attainment of the foregoing and related advantages and features of the invention should be more readily apparent to those skilled in the art, after review of the following more detailed description of the invention taken together with the drawings.

DETAILED DESCRIPTION

Figure 1:
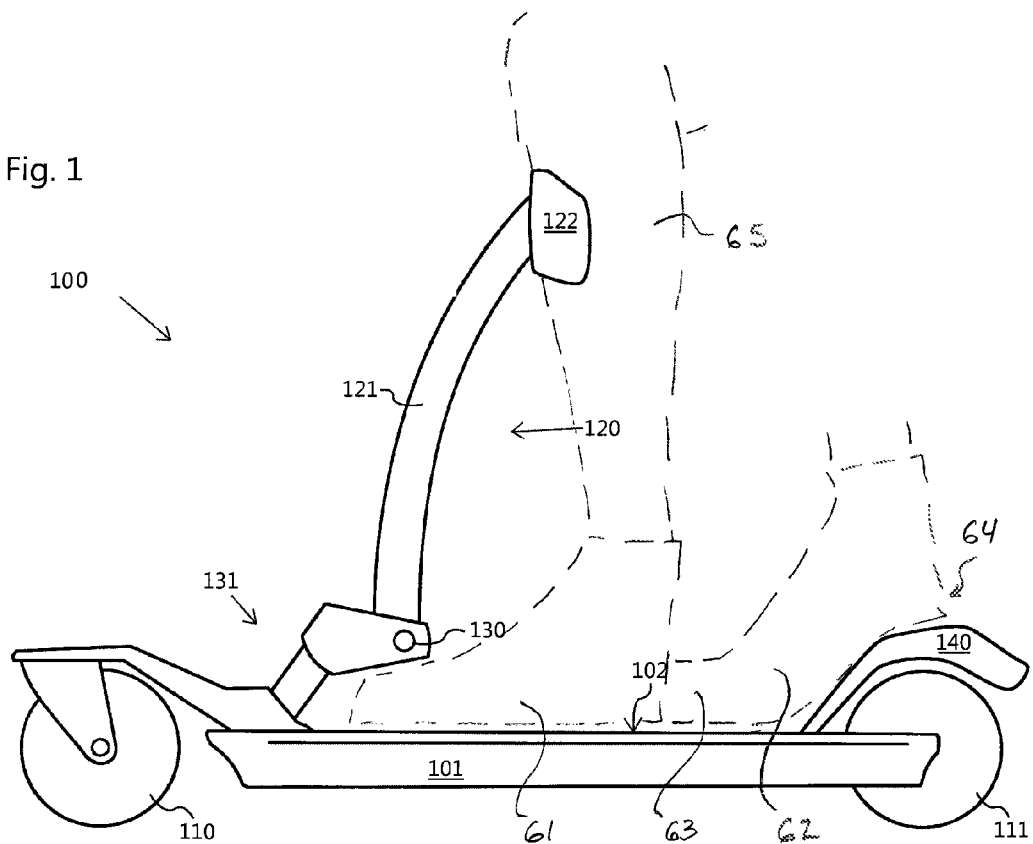
FIGS. 1 and 2 are a side elevation and a perspective view of a leg scooter in accordance with the present invention.
Figure 2:
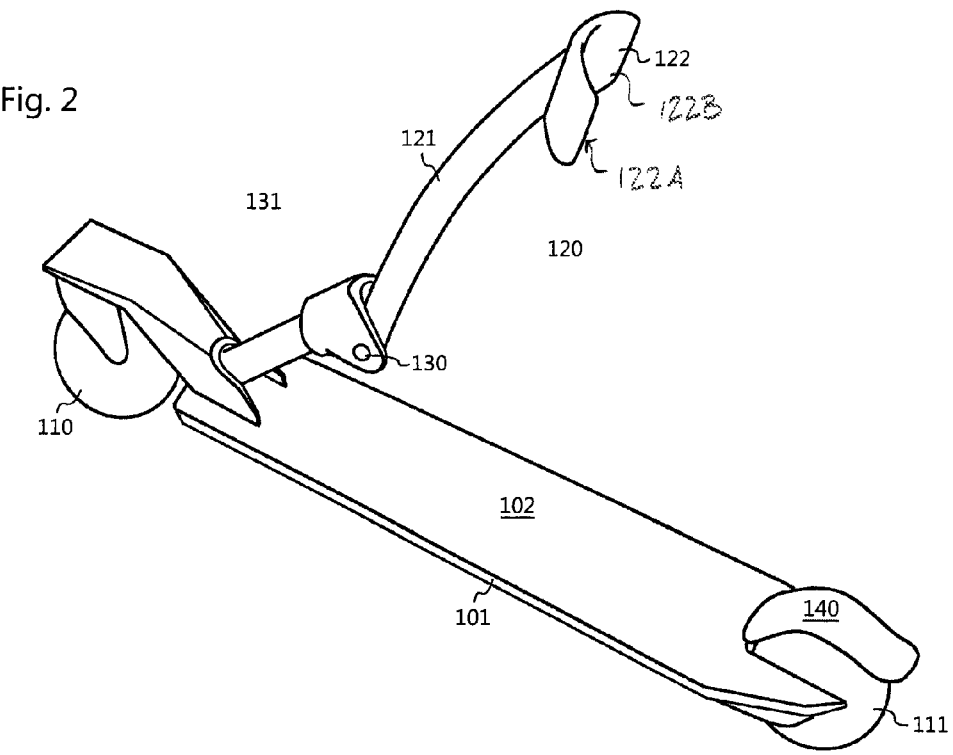

Referring to FIGS. 1 and 2, one embodiment of a leg scooter device 100 in accordance with the present invention is shown. Scooter device 100 may include a frame 101, a foot platform or surface 102 coupled to the frame, a front wheel 110 and a rear wheel 111, and a leg engaging structure (LES) 120 coupled toward a forward portion of frame 101. Frame 101 is preferably an elongated rigid structure oriented in the direction of travel.

Foot surface 102 may be formed integrally with frame 101 or as a separate component that is affixed thereto. Surface 102 may be substantially flat. It may be configured to permit a user to position both feet on the surface, as a rider might in a conventional scooter. Alternatively, frame 101 and foot surface 102 may be of a different size, yet of sufficient length to support at least one of the rider's feet, and may have a width comparable to that of the average rider's foot, or other. Rear wheel 111 is coupled toward the rear of frame 101, and in this embodiment, is a standard wheel.

Front wheel 110 is preferably coupled toward the front of frame 101. In the embodiments of FIGS. 1 and 2, front wheel 110 is a caster wheel mounted on an incline or tilted so as to be biased toward a forward-facing position. The inclined or biased direction caster 110 is coupled to frame 101 such that as the surface 102 and frame 101 are tilted lateral (from side to side), the front wheel pivots thus turning the scooter device without a handlebar. The amount of turn that results from a given amount of tilt depends on the degree of incline of the caster (as is known).

In the embodiment of FIGS. 1 and 2, the front wheel is preferably a caster and the rear wheel is a standard wheel mounted directly to the frame, but in other possible embodiments, the front and rear wheels may be configured differently, according to methods known in the art.

LES 120 may include an ascending member 121 and a leg contacting surface 122. Ascending member 121 may be formed in an elongated curved shape, or other shape, and extend upwardly (vertically or diagonally) toward a riders lower leg. The ascending member 121 may be coupled to a forward portion of frame 101 at a position in front of foot surface 102 and behind front wheel 110, or other. Leg contact surface 122 is the inward-facing surface of an end piece or leg contact member 123 coupled to the upper end of ascending member 121. Thus leg contact surface 122 is disposed at a height where it can contact the front of the rider's lower leg. Various other implementations of the leg contact surface and ascending member are possible without deviating from the present invention. These alternatives may include providing a leg contact member 123 which is pivotably coupled to the ascending member to better fit with a rider's leg, or a leg contact surface which is continuous with the ascending member without a distinct end piece.

Leg contact surface 122 have a slight concave curvature and/or have a recess, at least in part, to receive and the leg of a rider, and may be made of or have an outer material that is soft or yielding for comfort, and/or selected to provide friction, such as rubberized materials.

To propel the vehicle, a rider preferably stands with one foot 61 (drawn in phantom lines) on foot surface 102 and pushes against the ground with the other foot 62. When gliding, the propelling foot may also rest fully or partially upon the foot support surface, depending on the size of the foot support surface.

In the embodiment of FIGS. 1-2, the toe 63 of the propelling foot may rest upon the rear portion of foot support surface 102 (as shown in FIG. 1), with the heel 64 near brake 140. During use, the rider can press his/her forward leg 65 against contact surface 122, providing direct connection to and control of the scooter by the legs and lower torso of a rider. This control may be similar to that provided by a handle bar, yet is different in that it is generated primarily through the more powerful lower torso, rather than the upper torso. This, in turn, may create a riding experience more resembling surfing.

The leg contact surface 122 may have a curvature such that there is contact with the left and right sides of the rider's leg. These areas of side contact or partial side contact 122A, 122B, in addition to friction from the larger area of contact on the front of the leg, enable LES 120 to securely and/or sufficiently connect to the leg 65 of the rider. Without LES 120 or the like, it may be difficult for a rider to keep the vehicle laterally stable.

The base 124 of LES 120 may include an anchoring structure 131 affixed to frame 101. Ascending member 121 is coupled to anchoring structure 131 through a joint 130 which enables it to pivot substantially in the fore-and-aft plane to allow for changes in angle of the rider's lower leg 65 while riding. Joint 130 preferably does not allow for substantial side-to-side movement relative to frame 101. A flexible rod or cushion 132 may be coupled at its upper end to ascending member 121 and at its lower end to anchoring structure 131 (as shown in the figure), for biasing LES 120 toward a certain position. When the rider bends his knee, effectively pushing the ascending member 121 to pivot slightly forward, flexible cushion 132 resists the change in position so that leg contact surface 122 remains in contact with the rider's leg and continues to provide stabilization and/or connection.

Other embodiments may have other mechanisms for biasing the LES toward a certain position. Alternately, the ascending member 121 may be formed from a slightly flexible material, eliminating the need for additional spring or supplemental resilient member.

Figure 3:
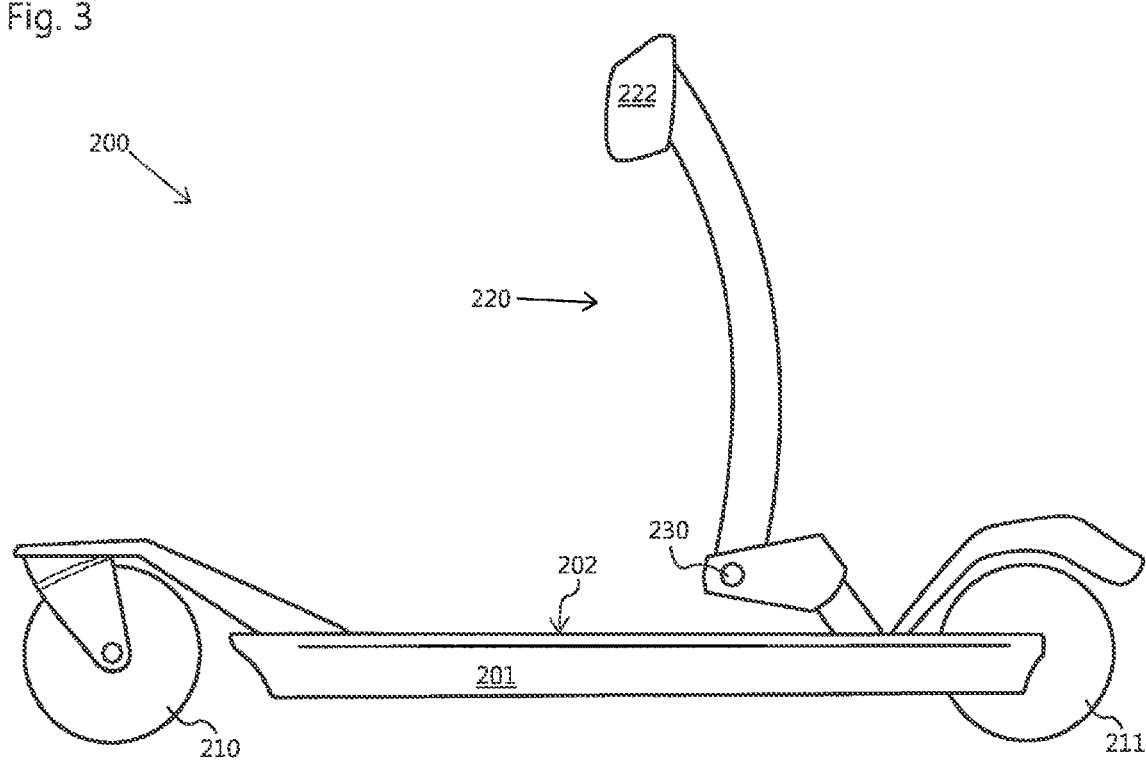
FIG. 3 is a side elevation view of another embodiment of a leg scooter in accordance with the present invention.

Referring to FIG. 3, another embodiment of a leg scooter device 200 in accordance with the present invention is shown. Scooter device 200 may include a frame 201, a foot platform or surface 202, a front wheel 210, a rear wheel 211, and LES 220. Unlike the embodiment of FIG. 1, LES 220 of this embodiment is configured, relative to the frame, to contact the back side of a rider's leg. In the embodiment of FIG. 3, LES 220 is coupled toward a rear portion of frame 201, rearward of foot surface 202 and forward of rear wheel 211, though it may be elsewhere coupled. LES 220 may have a joint 230, analogous to joint 130 of FIG. 1, but oriented in the opposite direction.

Figure 4:
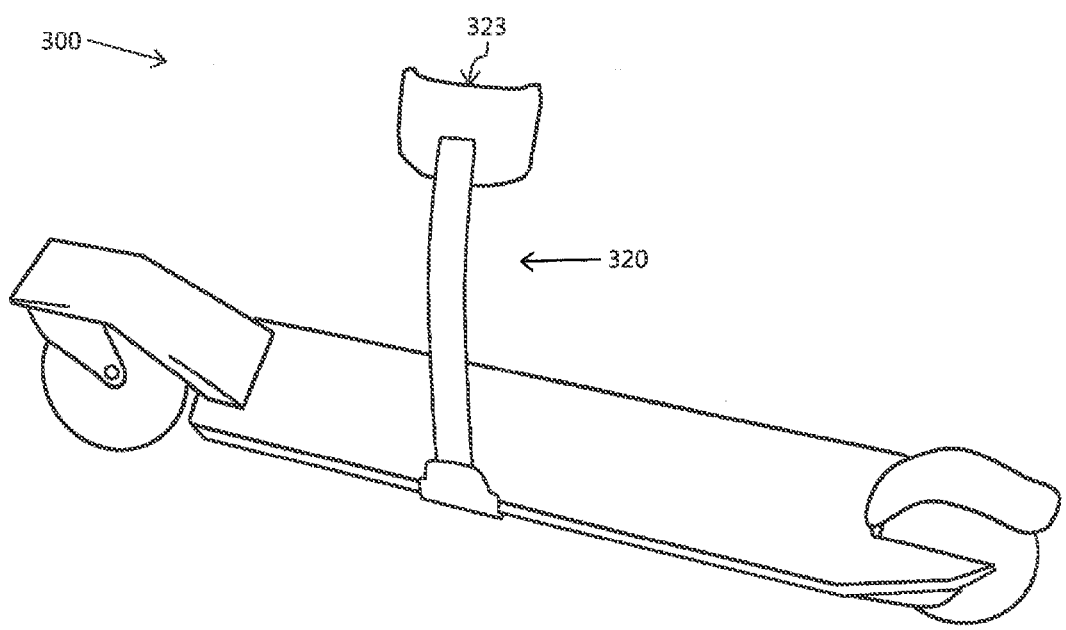
FIG. 4 is a view of another embodiment of a leg scooter in accordance with the present invention.

Referring to FIG. 4, another embodiment of a leg scooter device 300 in accordance with the present invention is shown. The LES 320 of leg scooter 300 preferably has primary contact with the side of a rider's leg, more so than the front or back of the leg. Depending on whether LES 320 is coupled to the left or right side of the scooter, and depending on the rider's preference for a propulsion leg, leg contact surface 323 may contact the inward or outward side of a rider's leg. While not shown, LES 320 may or may not have a joint such as 130,230 discussed above.

Figure 5:
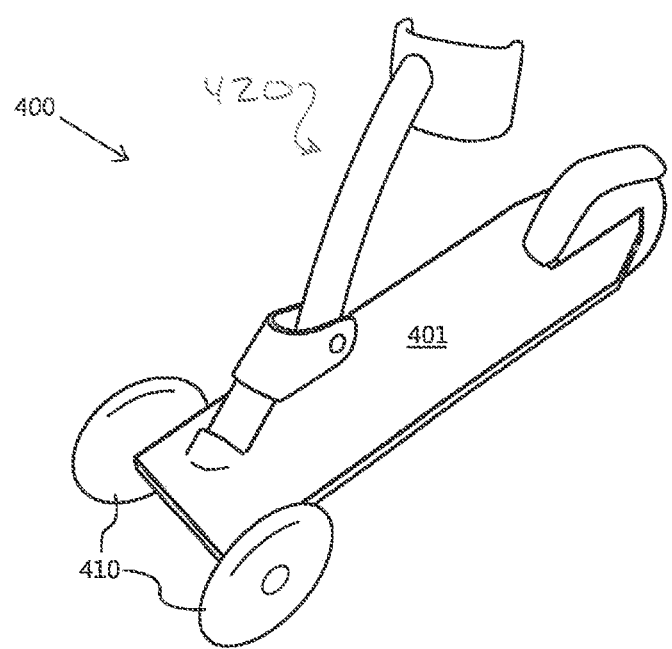
FIG. 5 is a perspective view of another embodiment of a leg scooter having two parallel front wheels in accordance with the present invention.

Referring to FIG. 5, another embodiment of a leg scooter device 400 in accordance with the present invention is shown. Leg scooter 400 preferably has two parallel front wheels 410, which is a more stable configuration than to a single wheel. The two front wheels may be configured to turn when frame 401 is tilted laterally, i.e., to the left or right, such that the vehicle can be steered by shifting of a rider's weight. Parallel, turning wheel structures are known in the art.

Figure 6:
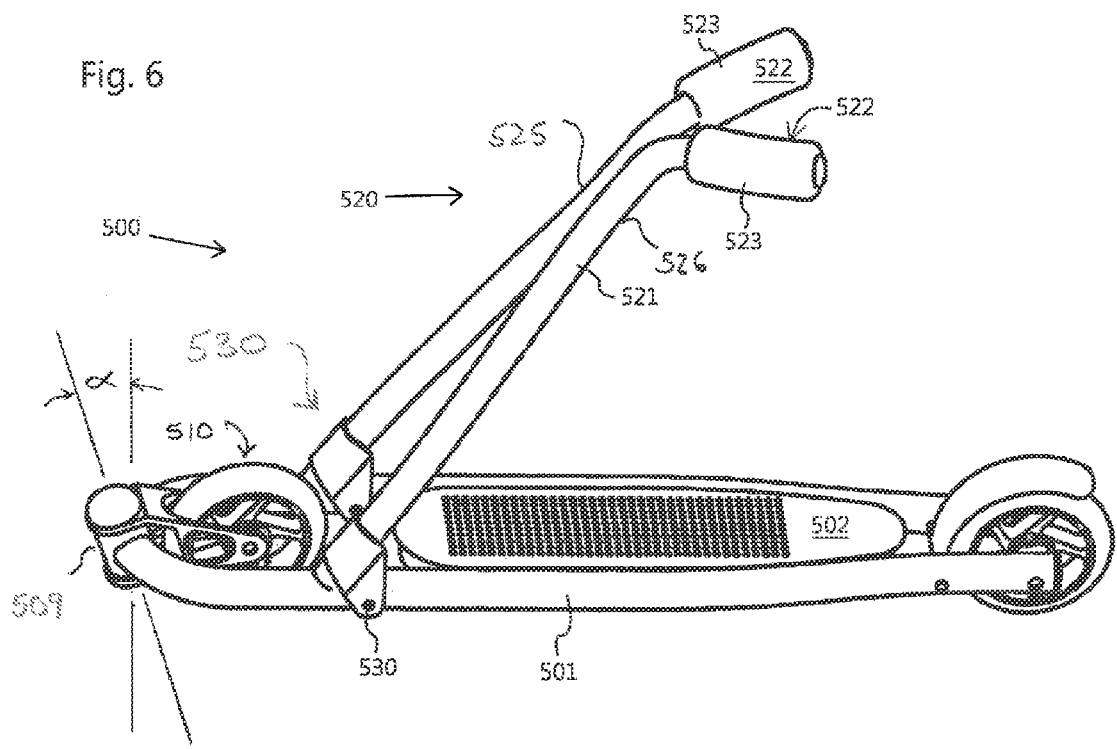
FIGS. 6 and 7 are perspective views of another embodiment of a leg scooter, in the extended and collapse positions, in accordance with the present invention.
Figure 7:
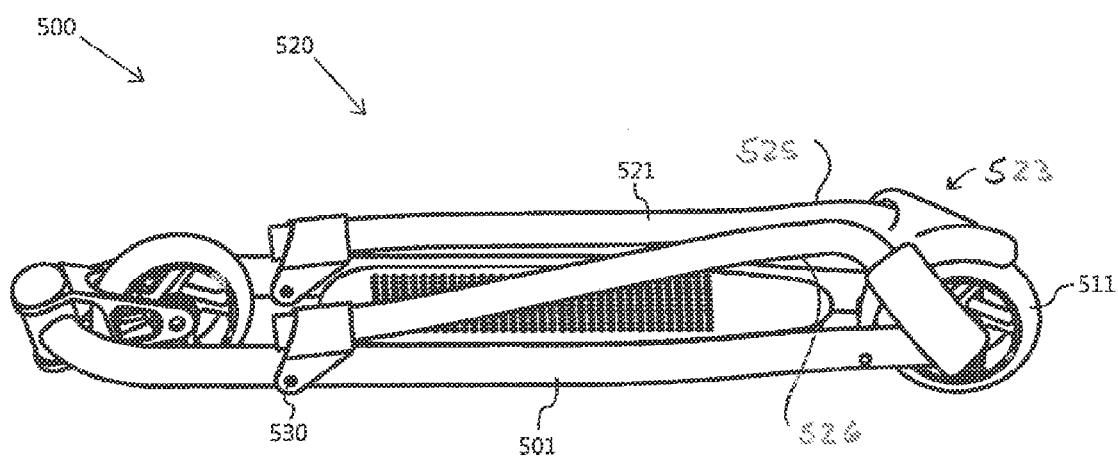

Referring to FIGS. 6 and 7, perspective views of another embodiment of a leg scooter device 500, in the extended and collapse positions, in accordance with the present invention are shown. Leg scooter 500 may have a LES 520 that includes an ascending member 521 and leg contacting surfaces 522. Ascending member 521 may include two elongated members 525,526 attached respectively to the left and right sides of frame 501 and extending diagonally upward and rearward. The elongated members 525,526 converge until they meet at a point where they are attached to each other (through welding, initial molding, fasteners or some other mechanism) and then diverge into a V, U or like recessed shape which can receive a rider's leg. Each elongated member may have a soft cover 522 or the like on its upper end 523, particularly the inward-facing surfaces that effectively make up the leg contact surface 522. LES 520 may be pivotably coupled to frame 501 through a joint 530 at a base of each elongated member, or otherwise coupled. When leg scooter 500 is in use, LES 520 may be configured to pivot forward and backward through a range that allows leg contact surfaces 522 to follow changes in angle of a rider's leg as the rider shifts his/her weight or bends a knee.

Joints 530 also allow leg scooter 500 to collapse for carrying and stowing, by folding LES 520 backward toward or into contact with frame 501 (the collapsed or storage arrangement). A mechanism may be provided for selectively locking LES 520 into its slightly pivotable in-use position, and into its substantially non-pivotable collapsed position.

Front wheel 510 may be implemented as a biased direction caster. Wheel 510 may be coupled about a pivot shaft 509 which is inclined at tilt angle, a, or be otherwise arranged While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features herein before set forth, and as fall within the scope of the invention and the limits of the appended claims.

The invention claimed is:

1. A leg scooter device, comprising:
at least a first turnable front wheel and at least a first fixed position rear wheel;
a non-stirruped foot platform located between the front wheel and the rear wheel that has a substantially unencumbered top surface for ready placement of at least a rider's front foot substantially parallel with the line of direction of travel of the device; and
an ascending control member having a first end that is coupled proximate a front portion of the foot platform and a second end that ascends upwardly from the platform in use;
a recessed shin contact surface that is coupled toward the second end of the ascending control member and is positioned such that when a rider places his or her front foot on the platform in the line of direction of travel and bends his or her ankle joint forward, a lower leg of that rider contacts the recessed contact surface;

wherein the ascending control member and the recessed contact surface are configured such that the recessed contact surface may be moved forward by the force of a rider's lower leg against the recessed contact surface, yet be biased to return to an initial in-use position in the absence of the lower leg displacement force, thereby creating an engaging bias to retain engaged contact between the rider's lower front leg and the contact surface as that lower leg moves in response to bending of the rider's ankle.

2. The leg scooter of claim 1, wherein the ascending control member is mounted with a biased pivot joint that allows movement of the ascending control member via the pivot and provides the engaging bias.

3. The leg scooter of claim 1, wherein the ascending control member is formed of a flexible, elastic material that allows movement of the ascending control member and provides the engaging bias.

4. The leg scooter of claim 1, wherein the recessed contact surface is disposed substantially rearwardly so that a rider moving his or her front lower leg forward may readily and unobstructedly insert that lower leg into contact with the recessed contact surface.

5. The leg scooter of claim 1, further comprising a brake associated with the rear wheel, the brake being activated by a rider applying weight substantially downward through one foot to the brake which is thereby moved into frictional braking contact with the rear wheel.

6. The leg scooter of claim 1, wherein the front wheel is a forward-direction biased caster wheel.

7. The leg scooter of claim 1, further comprising a second turnable front wheel arranged substantially in parallel with the first front wheel, wherein the first front wheel and second front wheel are arranged within the scooter to turn substantially in parallel when the foot platform is tilted laterally.

8. The leg scooter of claim 1, wherein the distance that the ascending control member rises vertically above the foot platform is less than the distance of the front wheel to the rear wheel, measured from the outside of those wheels.

9. The leg scooter of claim 6, wherein the forward direction biased front wheel is a forward tilt caster wheel.

10. A leg scooter device, comprising
at least a first turnable front wheel and at least a first fixed position rear wheel;
a foot platform provided between the front and rear wheel that is configured for ready placement of at least a rider's front foot substantially parallel with the line of direction of travel of the device;
a leg engaging control structure having a first end that is coupled proximate the foot platform and a second end that extends upwardly above the foot platform; and
a lower leg contact surface coupled toward the second end of the leg engaging control structure and being configured in shape and oriented substantially rearwardly in position such that when a rider places his or her front foot on the platform in the line of direction of travel of the device and bends his or her ankle joint forward, the lower leg of that rider contacts the lower leg contact surface;
wherein the leg engaging control structure and the lower leg contact surface in an upwardly extended in-use position are configured such that the contact surface may be moved forward by the force of the rider's lower leg against the contact surface, yet be biased to return to the initial upwardly extended in-use position in the absence of the lower leg displacement force, thereby creating an engaging bias to retain engaged contact between the rider's lower front leg and the contact surface as that lower leg moves in response to bending of the rider's ankle.

11. The leg scooter of claim 10, wherein the leg engaging control structure is at least one of:
mounted with a biased pivot joint that allows movement of the leg engaging control structure via the pivot and provides the engaging bias; and
formed of a flexible, elastic material that allows movement of the leg engaging control structure and provides the engaging bias.

12. The leg scooter of claim 10, wherein the foot platform is below a top of the front and rear wheels.

13. The leg scooter of claim 10, further comprising a brake associated with the rear wheel, the brake being activated by a rider applying weight substantially downward through one foot onto the brake which thereby moves the brake into frictional braking contact with the rear wheel.

14. The leg scooter of claim 10, wherein the leg engaging control structure is movable between an upwardly extended in use position and a collapsed stowage position.

15. The leg scooter of claim 10, wherein the first front wheel is a forward-direction biased caster wheel.

16. The leg scooter of claim 10, further comprising second front wheel arranged substantially in parallel with the first front wheel.

17. A leg scooter, comprising:
at least a first turnable front wheel and at least a first fixed position rear wheel;
a foot platform located between the front wheel and the rear wheel that is configured for ready placement of at least a rider's front foot substantially parallel with the line of direction of travel of the device;
an ascending control member having a first end that is coupled proximate the foot platform and a second end that extends upwardly above the first end in use;
a lower leg contact surface coupled toward the second end of the ascending control member;
wherein the ascending control member is configured to ascend to a height above the foot platform, and the lower leg contact surface is configured in shape and orientation such that when a rider places his or her front foot on the platform in the line of direction of travel of the device and bends his or her ankle joint forward, the lower leg of that rider contacts the lower leg contact surface; and
wherein the ascending control member and the lower leg contact surface are configured such that the contact surface may be moved forward by the force of the rider's lower leg against the contact surface, yet be biased to return to an initial in-use position in the absence of the lower leg displacement force, thereby creating an engaging bias to retain engaged contact between the rider's lower front leg and the contact surface as that lower leg moves in response to bending of the rider's ankle; and
a brake associated with the rear wheel, the brake being activated by a rider applying weight substantially downward through one of his or her feet onto the brake thereby moving the brake into frictional braking contact with the rear wheel.

18. The leg scooter of claim 17, wherein the lower leg contact surface is disposed substantially rearwardly so as to be appropriately positioned to engage a forwardly moving lower leg of a rider.

19. The leg scooter of claim 18 having at least one of:
a forward direction biased caster wheel as the front wheel;
a length dimension from front to back in the line of direction of travel that is greater than a height dimension; and
the leg contact surface having a bias force which a rider may apply pressure against to enhance engagement between a rider's lower leg and the leg scooter.

\* \* \* \* \*